Aug. 22, 1950 W. N. DEAN 2,519,359
AUTOMATIC VOLUME CONTROL
Filed Sept. 29, 1944
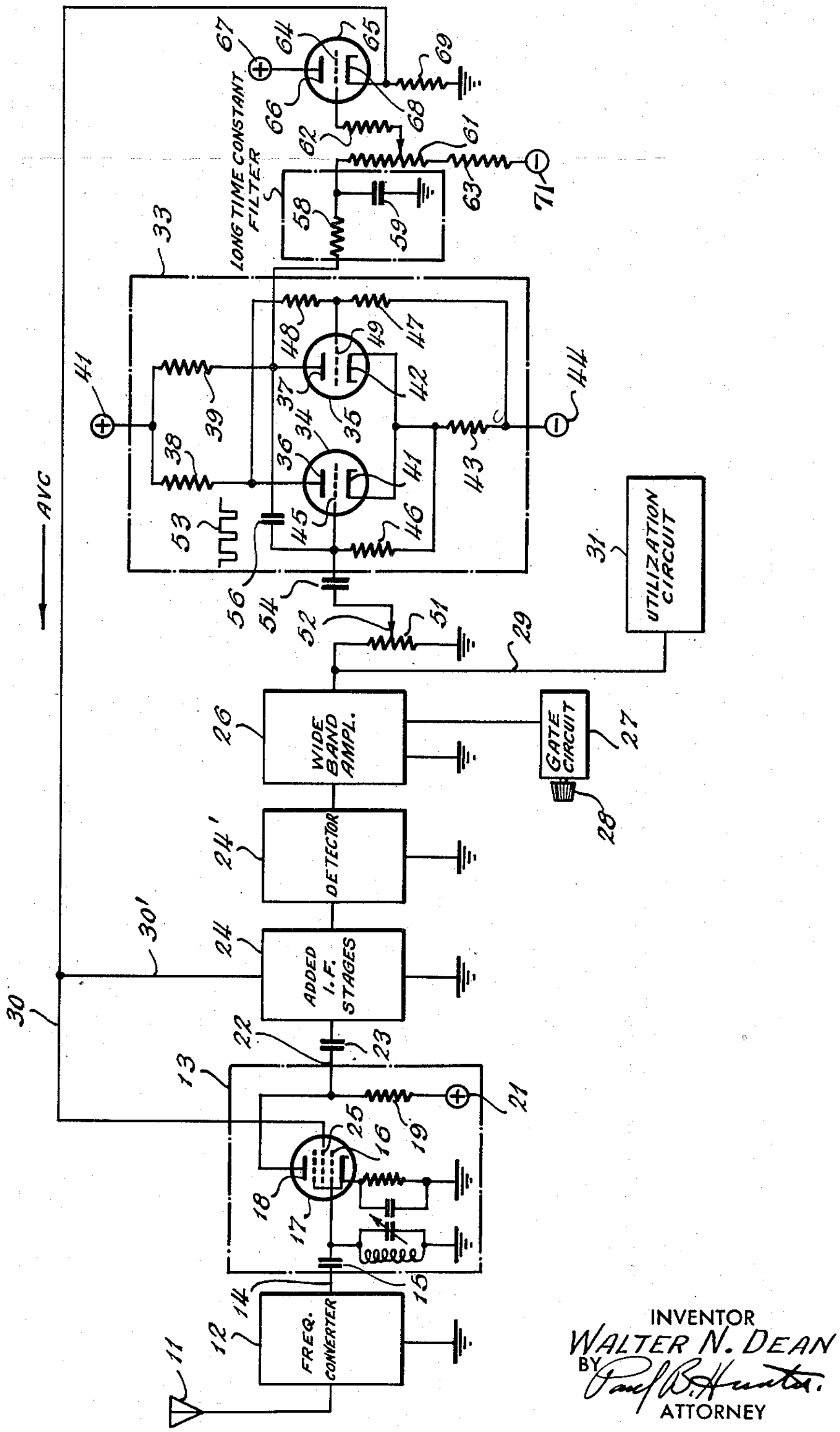
INVENTOR
WALTER N. DEAN
BY Paul B. Hunter
ATTORNEY Patented Aug. 22, 1950 2,519,359

UNITED STATES PATENT OFFICE 2,519,359

AUTOMATIC VOLUME CONTROL

Walter N. Dean, Washington, D. C., assignor to The Sperry Corporation, a corporation of Delaware Application September 29, 1944, Serial No. 556,439

3 Claims. (Cl. 250—20)

This invention relates generally to automatic volume control for radio receivers and is particularly useful in pulse receivers such as those designed for object detecting and ranging, sometimes referred to as "radar receivers."

Pulse receivers usually are provided with apparatus known as a "gate circuit" which functions to render the receiver alternately operative and inoperative periodically for relatively short and long intervals, respectively. It is desirable to control the sensitivity of the receiver automatically according to the average amplitude of signals passed during the brief operative periods. Since these periods are usually of short duration as compared to the intervals of inoperativeness, changes in the magnitude of passed pulses, when averaged over the entire period, become so small that they are difficult to use for automatic gain control purposes.

A major object of the present invention is to provide improved automatic volume control apparatus responsive to the average output strength of received signals for controlling the sensitivity of a receiver.

Another object of the invention is to provide improved automatic volume control apparatus for controlling the sensitivity of a pulse receiver according to the average amplitude of "gated pulses," i. e., pulses received during the periods of receiver operativeness, as controlled by the gate circuit.

A further object of the invention is to provide improved automatic volume control for a radio receiver in which the sensitivity of the receiver is controlled by variable screen grid potentials.

A further object of the invention is to provide automatic volume control apparatus responsive to gated pulses for producing a screen grid voltage variable according to the amplitude of signals passed during the gated intervals of receiver operativeness.

A still further object of the invention is to provide improved automatic volume control apparatus in which voltage pulses are produced responsive to the magnitude of received energy and the sensitivity of the receiver is controlled according to the frequency of the produced pulses.

Other objects and advantages of the invention will become apparent from the following specification taken in connection with the accompanying drawing, the single figure of which shows a schematic wiring diagram of a pulse receiver including automatic volume control apparatus embodying the present invention.

According to this invention, short pulses of energy from a receiver are utilized to produce longer pulses of a fixed magnitude but of a variable frequency dependent upon the magnitude of the pulses from the receiver. These long fixed-amplitude pulses are integrated and the sensitivity of the receiver is controlled according to the time-average of the fixed pulses thus produced.

Preferably, the automatic volume control apparatus for accomplishing this includes a multivibrator connected to be triggered by the gated output of a pulse receiver. The multivibrator is triggered when the gated output of the pulse receiver exceeds a predetermined magnitude and, when triggered, produces a long pulse of fixed amplitude. These long pulses are integrated to produce an average voltage dependent upon the frequency of the long pulses, and this voltage is utilized to control the potential of screen grids in the intermediate frequency amplifier section of the receiver. Since the sensitivity of this amplifier depends upon the screen grid potential, the sensitivity of the receiver is controlled according to the frequency at which the multivibrator is triggered, which, in turn, depends upon the output level of the gated pulses. The multivibrator in these receiver circuits is adjusted to be triggered just frequently enough to maintain the desired output level of gated energy.

Referring now to the drawing, there is shown an antenna 11 which collects energy and supplies it to a frequency converter 12 of a conventional superheterodyne receiver circuit. Intermediate frequency energy is supplied by converter 12 to a first intermediate frequency amplifier stage 13 as by lead 14 and coupling condenser 15 to control grid 16 of intermediate frequency amplifier pentode 17. The pentode 17 is connected in a conventional intermediate frequency amplifier circuit with its plate 18 connected through load resistor 19 to a source 21 of positive potential to produce an output signal at lead 22 which is coupled through condenser 23 to additional intermediate frequency amplifier stages represented by rectangle 24. The pentode 17 has its screen grid 25 connected to lead 30 to which is connected a voltage source variable according to the output level of the receiver in a manner to be described. Thus, the potential of the screen grid 25 is varied according to the output level of the receiver. Similarly, screen grids of other intermediate frequency stages may be controlled by lead 30' connected to the lead 30.

The output of the intermediate-frequency amplifier stages represented collectively in rectangle 24 is supplied to a conventional detector 24' having its output connected to a wide band video amplifier 26, which is controlled by a gate circuit 27 to periodically render the wide band amplifier 26 operative and inoperative. The gate circuit 27 is designed to permit energy reception during relatively short intervals of time and to render the receiver inoperative during longer intervals. The gate circuit 27 is adjustable as by control knob 28 to vary the period during which the receiver is operative, so this period corresponds with the period during which certain pulses of energy are received at the antenna 11.

In radio ranging systems of the pulse type, the gate circuit 27 operates at the frequency at which pulses are radiated toward an object; accordingly, the wide band amplifier 26 is rendered operative for a very small interval in each cycle during which reflected pulses are received at the antenna 11 and rendered inoperative for the much longer period between received pulses. For example, in one arrangement of a radio ranging system the short pulses of radiated energy have a duration of approximately one microsecond, whereas the period between pulses is approximately 5,000 microseconds. It will be apparent, therefore, that the wide band amplifier 26 may be made operative for one microsecond and then inoperative for 5,000 microseconds during each cycle of operation of the gate circuit 27.

If the output level of energy from the wide band amplifier, which is supplied by lead 29 to utilization circuit 31, is averaged over the entire time period to provide an automatic volume control voltage, it will be apparent that changes in the magnitude of each pulse will become almost imperceptible when integrated over the longer period.

In accordance with the present invention, the gated pulses of energy from the wide band amplifier 26 are used to trigger a slave multivibrator circuit enclosed within dotted line 33, which includes a pair of electron discharge devices 34 and 35 connected in a conventional multivibrator circuit with the device 34 being normally conductive and the device 35 being normally non-conductive during the "off" period of the multivibrator. As may be seen in the drawing, the devices 34 and 35 have their plates 36 and 37 connected through load resistors 38 and 39 to a common source 41 of positive potential with respect to ground. Cathodes 41 and 42 are connected through common cathode resistor 43 to a source 44 of negative potential with respect to ground. Grid 45 of the device 34 is connected through resistor 46 to the cathode 41, so it normally has zero bias and device 34 is therefore conductive. In this condition, resistors 47 and 48 bias grid 49 negatively, so the tube 35 is non-conductive.

The output of the wide band amplifier 26 is applied across potentiometer 51, and slider 52 thereof is adjusted so that negative pulses, such as those indicated at 53 from the wide band amplifier 26, applied through coupling condenser 54, when they exceed a predetermined amplitude, cut off the plate current flow through the tube 34 and the potential of grid 49 of the tube 35 is raised, so the tube 35 becomes conductive. With these conditions, the multivibrator circuit is considered as being "on" and will remain so for a fixed time interval, determined by the time required to charge condenser 56 through resistors 39 and 46, at the end of which the tube 34 will again become conductive. In the illustration above, where the pulse repetition rate of the gate circuit 27 has a period of about 5,000 microseconds, the multivibrator is designed to remain "on" about 4,500 microseconds, leaving about 500 microseconds for the "off" period.

The potential variations of plate 37 provide an output voltage which may be connected to the integrating circuit shown in this case as a long time constant filter network formed of resistor 58 and condenser 59 connected across the multivibrator to provide an average of the output voltage of plate 37, this average voltage appearing across the condenser 59. The time constant of the integrating network 58, 59 must be chosen with care because too short a time constant will allow a change in receiver sensitivity for each individual pulse, whereas too long a time constant is likely to permit strong signals to saturate the receiver when the amplitude of the receiver output increases rapidly.

This average voltage across condenser 59 is supplied through potentiometer 61, the lower terminal of which is connected through resistor 63 to source of negative potential 71, and resistor 62 to the grid 64 of an electron discharge tube 65 that is arranged in a cathode follower circuit with its plate 66 connected to a source 67 of positive potential with respect to ground. The tube 65 has its cathode 68 connected through cathode resistor 69 to ground, so the voltage across cathode resistor 69 provides a low impedance source which may be connected by lead 30 to the screen grids of the intermediate amplifier stages. Since the screen grid voltage thus depends upon the average output voltage of the multivibrator, amplification of the intermediate amplifier stages is controlled inversely according to the magnitude of gated pulses from the wide band amplifier 26.

From the foregoing description, it will be apparent that gated pulses 53 from the wide band amplifier 26 trigger the slave multivibrator 33 just frequently enough to maintain the pulses 53 at a desired level. The voltage of plate 37 is changed from the fixed voltage of source 41 during the "off" condition of the multivibrator to a lower fixed voltage during the "on" condition thereof when the multivibrator is triggered. This change of the voltage of plate 37 occurs just frequently enough to provide an average voltage across condenser 59 which will maintain the pulses from the amplifier 26 at a desired level by controlling the potential of the screen grids of the intermediate frequency amplifier tubes.

The multivibrator is triggered by gated pulses to produce a chain of voltage impulses at a frequency dependent upon the average amplitude of the gated pulses. These impulses are integrated and used to control the screen grid potential of the intermediate frequency amplifier stages thereby varying the sensitivity of the receiver to maintain a desired energy level for the gated pulses.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a pulse type receiver system, a receiver adapted to receive radio pulses of relatively short duration, and automatic volume control apparatus including a slave multivibrator, said multivibrator being so constructed and arranged as to produce an output of long pulses as compared to said received pulses and pulses of fixed magnitude, means responsive to the received pulses exceeding a predetermined amplitude for triggering said multivibrator only in response to said pulses exceeding said amplitude, and integrating means connected to receive the output of said multivibrator and in turn connected to control the sensitivity of said receiver in accordance with the output voltage of said integrating means.

2. In a pulse type receiver system, a receiver adapted to receive radio pulses of relatively short duration, gating means for periodically rendering said receiver operative for short intervals of time of the order of the length of said short pulses whereby to pass substantially only said short pulses of received energy, automatic volume control apparatus including a slave multivibrator, said multivibrator being so constructed and arranged as to produce an output of long pulses as compared to said received pulses and pulses of fixed magnitude, means responsive to the received pulses exceeding a predetermined amplitude for triggering said multivibrator only in response to said pulses exceeding said amplitude, and integrating means connected to receive the output of said multivibrator and in turn connected to control the sensitivity of said receiver in accordance with the output voltage of said integrating means.

3. In a pulse type receiver system, a receiver adapted to receive radio pulses of relatively short duration, gating means for periodically rendering said receiver operative for short intervals of time of the order of the length of said short pulses whereby to pass substantially only said short pulses of received energy, automatic volume control apparatus comprising a pair of electron discharge tubes arranged in a multivibrator circuit, said multivibrator being so constructed and arranged as to produce an output of long pulses as compared to said received pulses and pulses of fixed magnitude, means responsive to the received pulses exceeding a predetermined amplitude for triggering said multivibrator only in response to said pulses exceeding said amplitude, and integrating means connected to receive the output of said multivibrator and in turn connected to control the sensitivity of said receiver in accordance with the output voltage of said integrating means.

WALTER N. DEAN.

REFERENCES CITED

The following references are of record in the file of this patent:

UNITED STATES PATENTS

| Number | Name | Date |
|---|---|---|
| 1,924,174 | Wolf | Aug. 29, 1933 |
| 1,931,660 | Kauter | Oct. 24, 1933 |
| 1,956,711 | De Bellescize | May 1, 1934 |
| 2,060,969 | Beers | Nov. 17, 1936 |
| 2,222,759 | Burnside | Nov. 26, 1940 |
| 2,224,134 | Blumlein | Dec. 10, 1940 |
| 2,240,601 | Applegarth, Jr. | May 6, 1941 |
| 2,246,939 | Holmes | June 24, 1941 |
| 2,288,434 | Bradley | June 30, 1942 |
| 2,313,952 | Lewis | Mar. 16, 1943 |
| 2,371,397 | Koch | Mar. 13, 1945 |
| 2,408,821 | Stearns | Oct. 8, 1946 |
| 2,416,158 | Coykendall | Feb. 18, 1947 |
| 2,426,182 | Lange | Aug. 26, 1947 |
| 2,434,294 | Ginzton | Jan. 13, 1948 |